(12) United States Patent
Zhang et al.

(10) Patent No.: US 12,050,800 B2
(45) Date of Patent: Jul. 30, 2024

(54) SYSTEMS AND METHODS FOR REORDERING DATA IN A STORAGE DEVICE BASED ON DATA ACCESS PATTERNS

(71) Applicant: Samsung Electronics Co., Ltd., Suwon-si (KR)

(72) Inventors: Tong Zhang, Mountain View, CA (US); Zongwang Li, Dublin, CA (US); Rekha Pitchumani, Oak Hill, VA (US); Yang Seok Ki, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 290 days.

(21) Appl. No.: 17/469,192

(22) Filed: Sep. 8, 2021

(65) Prior Publication Data

US 2023/0004318 A1    Jan. 5, 2023

Related U.S. Application Data

(60) Provisional application No. 63/217,697, filed on Jul. 1, 2021.

(51) Int. Cl.
*G06F 16/00* (2019.01)
*G06F 3/06* (2006.01)
(Continued)

(52) U.S. Cl.
CPC .......... *G06F 3/0649* (2013.01); *G06F 3/0611* (2013.01); *G06F 3/0629* (2013.01);
(Continued)

(58) Field of Classification Search
CPC .... G06F 3/0649; G06F 3/0611; G06F 3/0629; G06F 3/0679; G06F 11/3409; G06F 16/212
(Continued)

(56) References Cited

U.S. PATENT DOCUMENTS

| 10,585,801 B2 | 3/2020 | Jayasena et al. |
| 10,783,603 B2 | 9/2020 | Venkatesh et al. |

(Continued)

FOREIGN PATENT DOCUMENTS

WO    2020190798 A1    9/2020

OTHER PUBLICATIONS

Scalar Evolution and Loop Optimization, https://llvm.org/devmtg/2009-10/ScalarEvolutionAndLoopOptimization.pdf (last visited Sep. 8, 2021), 48 pages.

*Primary Examiner* — Monica M Pyo
(74) *Attorney, Agent, or Firm* — Lewis Roca Rothgerber Christie LLP

(57) ABSTRACT

A method for reordering data for storage includes detecting a data access pattern, associated with an application, for accessing a data, generating a remapping function based on a data access pattern information, the remapping function including operations to determine a reordering of the data based on address information for the data, receiving the data at a storage device, the data being ordered according to a first layout sequence, reordering the data, by the storage device, based on the remapping function, and storing the data, at the storage device, according to a second layout sequence corresponding to the data access pattern, the second layout sequence being different than the first layout sequence.

20 Claims, 7 Drawing Sheets

(51) Int. Cl.
  *G06F 11/34* (2006.01)
  *G06F 16/21* (2019.01)
  *G06F 16/22* (2019.01)

(52) U.S. Cl.
  CPC ........ *G06F 3/0679* (2013.01); *G06F 11/3409* (2013.01); *G06F 16/212* (2019.01); *G06F 16/2264* (2019.01)

(58) Field of Classification Search
  USPC .......................................................... 707/752
  See application file for complete search history.

(56) References Cited

U.S. PATENT DOCUMENTS

| | | | |
|---|---|---|---|
| 2005/0129319 A1* | 6/2005 | Lee ........................ | H04N 19/59 |
| | | | 375/E7.044 |
| 2020/0034347 A1* | 1/2020 | Selly ....................... | G06F 17/16 |
| 2020/0082215 A1 | 3/2020 | Aliabadi et al. | |
| 2021/0011730 A1 | 1/2021 | Surti et al. | |
| 2021/0124582 A1 | 4/2021 | Kerr et al. | |
| 2021/0265016 A1* | 8/2021 | Vessere .................. | G16B 40/20 |

\* cited by examiner

V0={0,1,2,3}

V0={0,2,1,3}

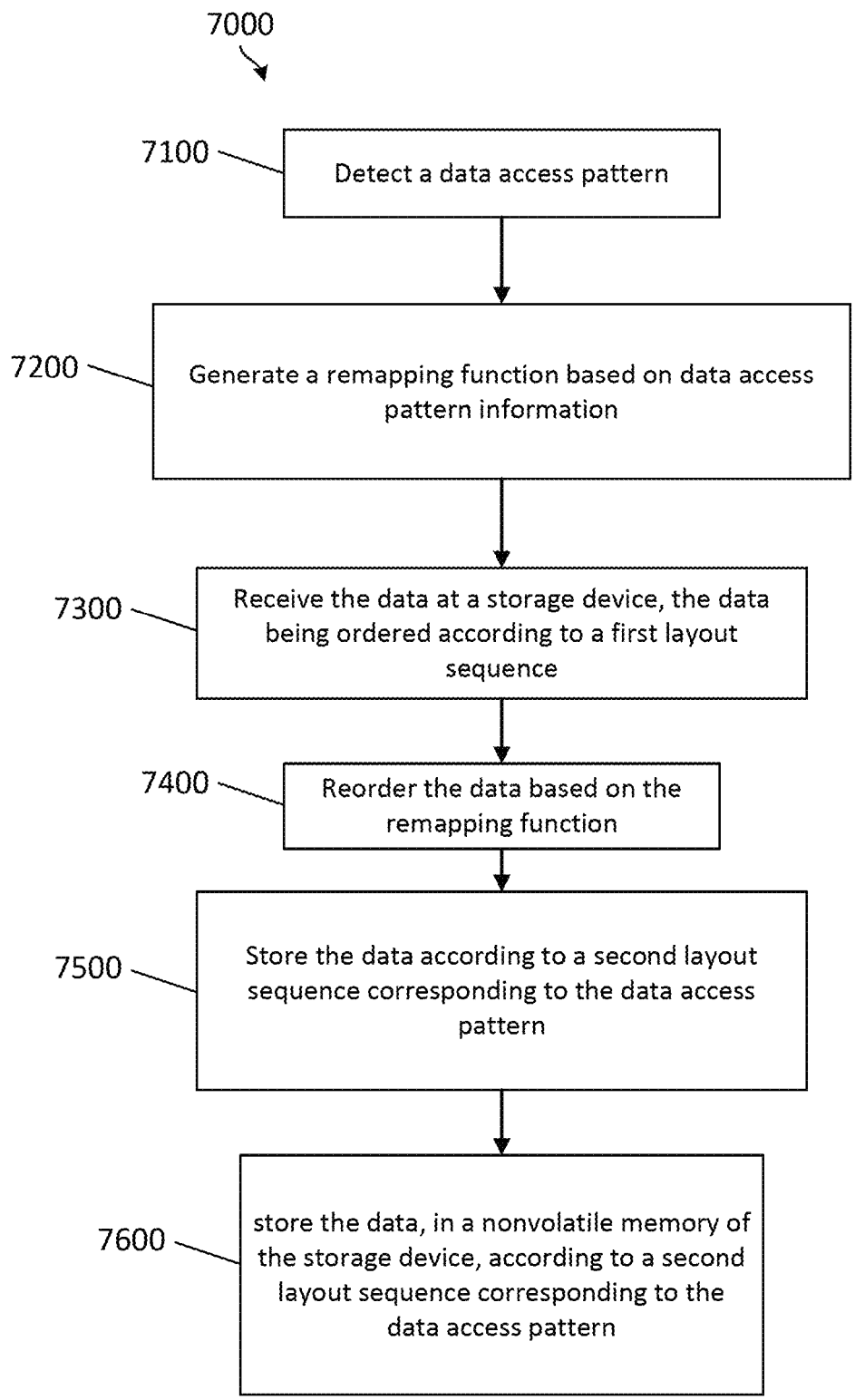

SYSTEMS AND METHODS FOR REORDERING DATA IN A STORAGE DEVICE BASED ON DATA ACCESS PATTERNS

CROSS-REFERENCE TO RELATED APPLICATION(S)

The present application claims priority to, and the benefit of, U.S. Provisional Application Ser. No. 63/217,697, filed Jul. 1, 2021, entitled "TILING/SWIZZLING-AWARE PLACEMENT AND PREFETCHING FOR CACHE LINE-ADDRESSABLE MEMORY/STORAGE DEVICES," the entire content of which is incorporated herein by reference.

FIELD

One or more aspects of embodiments according to the present disclosure relate to systems and methods for reordering data in a storage device based on data access patterns.

BACKGROUND

The present background section is intended to provide context only, and the disclosure of any embodiment or concept in this section does not constitute an admission that said embodiment or concept is prior art.

In the field of computer storage, a storage device may be used to store data to be accessed by a program (or application). The program (or application) may perform various operations with (or on) the data. For example, the program may access the data in smaller portions than accessing all of the data at once, or the program may access a given region of the data and ignore other regions. Thus, the program (or an algorithm implemented in the program) may have a particular access pattern for accessing the data (e.g., a data access pattern) that deviates from a different access pattern for the data.

Accordingly, there is a need for methods, devices, and systems for reordering data for storage in a storage device based on data access patterns.

SUMMARY

Aspects of embodiments of the present disclosure relate to computer storage systems, and provide improvements to the ordering of data within a storage device based on data access patterns.

According to some embodiments of the present disclosure, there is provided a method for reordering data for storage, the method including detecting a data access pattern, associated with an application, for accessing a data, generating a remapping function based on a data access pattern information, the remapping function including operations to determine a reordering of the data based on address information for the data, receiving the data at a storage device, the data being ordered according to a first layout sequence, reordering the data, by the storage device, based on the remapping function, and storing the data, at the storage device, according to a second layout sequence corresponding to the data access pattern, the second layout sequence being different than the first layout sequence.

The reordering the data based on the remapping function may include receiving, at the storage device, the remapping function or a mapping table.

The data access pattern may be detected by determining the data access pattern information from an application source code of the application.

The data access pattern may include a tiling access pattern or a swizzling access pattern.

The data may include an image data, the tiling access pattern corresponds to a partitioning of the image data by a graphics processing unit (GPU) or a central processing unit (CPU), the second layout sequence includes a tile sequence corresponding to the tiling access pattern, and the first layout sequence may include a linear sequence corresponding to an ordering of rows associated with the image data.

The second layout sequence may further include an ordering of sub-tiles within an ordering of tiles, the ordering of sub-tiles corresponding to the swizzling access pattern.

The data access pattern information may include tile dimension information, tile order information, image dimension information, or sub-tile order information.

The detecting the data access pattern or the generating the remapping function may be performed by a compiler.

The method may further include storing, at the storage device a first mapping table associated with accessing the data according to the first layout sequence, and a second mapping table associated with accessing the data according to the second layout sequence, receiving, by the storage device, a request to access the data according to the first layout sequence or the second layout sequence, and returning the data, by the storage device, in the first layout sequence based on the first mapping table or in the second layout sequence based on the second mapping table.

The first mapping table may include a linear access mapping table, the second mapping table may include a tiling access mapping table, and the returning the data in the second layout sequence may include returning a first tile and prefetching a second tile based on a next tile prefetch.

According to other embodiments of the present disclosure, there is provided a storage device for reordering data for storage, the storage device being configured to receive a data that is ordered according to a first layout sequence, reorder the data based on a remapping function, the remapping function being generated based on a data access pattern, associated with an application, for accessing the data, and store the data, at a nonvolatile memory of the storage device, according to a second layout sequence corresponding to the data access pattern, the second layout sequence being different than the first layout sequence.

The reordering the data based on the remapping function may include receiving, at the storage device, the remapping function or a mapping table.

The data access pattern may be detected by determining a data access pattern information from an application source code of the application.

The storage device may be configured to store a first mapping table associated with accessing the data according to the first layout sequence, store a second mapping table associated with accessing the data according to the second layout sequence, receive a request to access the data according to the first layout sequence or the second layout sequence, and return the data in the first layout sequence based on the first mapping table or in the second layout sequence based on the second mapping table.

The first mapping table may include a linear access mapping table, the second mapping table may include a tiling access mapping table, and the returning the data in the second layout sequence may include returning a first tile and prefetching a second tile based on a next tile prefetch.

According to other embodiments of the present disclosure, there is provided a system for reordering data for storage, the system including a host, and a storage device, wherein the storage device is configured to receive a data that is ordered according to a first layout sequence, reorder the data based on a remapping function, the remapping function being generated based on a data access pattern, associated with an application, for accessing the data, and store the data, at a nonvolatile memory of the storage device, according to a second layout sequence corresponding to the data access pattern, the second layout sequence being different than the first layout sequence.

The reordering the data based on the remapping function may include receiving, at the storage device, the remapping function or a mapping table.

The data access pattern may be detected by determining a data access pattern information from an application source code of the application.

The storage device may be configured to store a first mapping table associated with accessing the data according to the first layout sequence, store a second mapping table associated with accessing the data according to the second layout sequence, receive a request to access the data according to the first layout sequence or the second layout sequence, and return the data in the first layout sequence based on the first mapping table or in the second layout sequence based on the second mapping table.

The first mapping table may include a linear access mapping table, the second mapping table may include a tiling access mapping table, and the returning the data in the second layout sequence may include returning a first tile and prefetching a second tile based on a next tile prefetch.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 7 is a flowchart depicting example operations of methods for reordering data for storage, according to some embodiments of the present disclosure.

Figure 1:
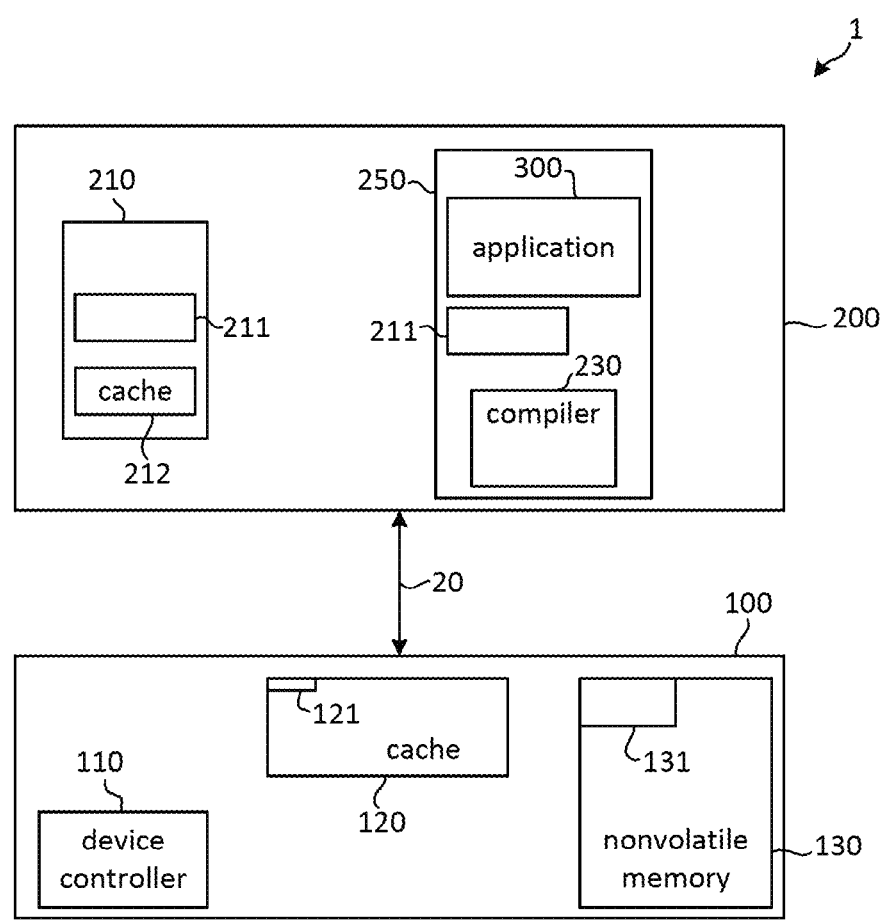
FIG. 1 is a system diagram depicting a system for reordering data for storage, according to some embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or component is referred to as being "on," "connected to," or "coupled to" another element or component, it can be directly on, connected to, or coupled to the other element or component, or one or more intervening elements or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or component is referred to as being "between" two elements or components, it can be the only element or component between the two elements or components, or one or more intervening elements or components may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Any of the components or any combination of the components described (e.g., in any system diagrams included herein) may be used to perform one or more of the operations of any flow chart included herein. Further, (i) the operations are example operations, and may involve various additional operations not explicitly covered, and (ii) the temporal order of the operations may be varied.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, in the field of computer storage, a storage device may be used to store data that may be associated with a matrix (e.g., a bitmap representing pixels or tiles of an image). A program (or application) may perform matrix manipulation with the data. For example, an application may access the data in smaller portions than the whole matrix at once, or the application may access a given region of the matrix and ignore other regions. Thus, the application may have a particular data access pattern that deviates from a different data access pattern. For example, the particular data access pattern may be a tiling access pattern and/or a swizzling access pattern, while the different data access pattern may be a row by row, or line by line, linear access pattern.

A "tile" may be a contiguous block of pixels that spans more than one row. For example, tiles may be created by breaking down a matrix (e.g., an image, which is a special type of matrix) into smaller pieces. Tiles are usually in a square or rectangular shape. A "sub-tile" may be a smaller contiguous block of pixels within a tile. A "tiling access pattern" may be an access pattern where data is accessed according to tiles and/or sub-tiles corresponding to a matrix or an image, rather than being accessed according to the whole matrix or whole image (or according to a linear sequence associated with the whole matrix or whole image). A "swizzling access pattern" may be an access pattern where data may be accessed according to a given access pattern (e.g., a predetermined access pattern, like a Z-order or any other pattern).

The data may be stored in the storage device according to the different data access pattern. Accordingly, a processing time (e.g., a kernel execution time) for accessing the data according to the particular data access pattern may be delayed due to the data being scattered within the storage device in relation to the particular data access pattern.

A storage device that takes into consideration aspects of computer architecture (e.g., DRAM access, CPU cache access, etc.) when providing placement and prefetching of data, may improve overall performance of a computer system (e.g., there may be a multiple order of magnitude performance difference compared to native, or conventional, approaches).

Aspects of embodiments of the present disclosure provide a compiler-assisted approach that may generate a data layout (e.g., an optimized data layout) that may be accessed more efficiently by many applications (e.g., applications involving matrix manipulation, such as machine learning applications).

Conventional graphics processing unit (GPU) based image processing methods may frequently have tiling/swizzling access patterns. Additionally, deep learning applications (or workloads) (e.g., image recognition, instance segmentation, other image processing, etc.) may also apply tiling/swizzling techniques. For example, convolutional neural networks and other image processing techniques may apply filters or convolutional kernels that compute outputs for regions or patches of input bitmaps that span multiple rows of the input bitmaps. In addition, filters or convolutional kernels may span multiple channels of a multi-channel bitmap.

Depending on a workload's algorithm, a GPU kernel might want to access data (e.g., an image, etc.) in a smaller chunk at a time. The smaller chunk may be called a tile. The tile may fit into a cache line so that the kernel ends up having good cache efficiency. Thus, data may be reorganized into tiles (e.g., tiles corresponding to a data access pattern associated with an algorithm to be applied to the data) to improve performance.

Data may be partitioned by a program for tiling, and the data may be stored in a linear 2D layout (e.g., in consecutive logical pages) in a storage device (e.g., the program may have a tiling access pattern, while the data is stored in a linear layout). In many cases, an application may request data access by tiling partition, rather than in consecutive logical pages. However, a storage device may not consider (e.g., may not be optimized for) GPU tiling and swizzling access patterns. For example, a storage device may store data in a linear format that may be less efficient (or less than optimal) for a given GPU workload. For example, data processing inefficiencies may occur when data is stored without consideration of data access patterns because the data may be scattered for a particular data access pattern.

Accordingly, system performance may be negatively affected as a result of an inefficient data layout. For example, a GPU kernel execution time and a number of accesses may be significantly increased.

To improve system or device performance, a device controller may be configured to detect a data access pattern and remap the data accordingly.

In some embodiments, data may be reordered according to a tiling/swizzling access pattern for cache line addressable storage while still allowing for linear access.

Many improvements and advantages may be obtained by a system for reordering data, according to aspects of embodiments of the present disclosure. For example, an overall load latency may be reduced due to data being packed together (e.g., in a tile corresponding to the access pattern of the algorithm that is processing the data), such that the data of a tile may be read all at once, instead of being read and transferred from multiple locations. Bandwidth use may be improved due to storing the data in a packed manner because the data may be transferred more efficiently and with a fewer number of transfers. At a cache line level, more efficiently packed data may ensure that all the data in a cache line is useful. At a device level (e.g., a NAND chip level), more efficiently packed data may ensure that all the data in a NAND page is useful. Thus, for transferring the same amount of useful data, bandwidth may be improved. Efficiency may be improved because the storage device may be more likely to pre-fetch the next data that will be used by the algorithm. Power consumption may be indirectly improved based on a more efficient use of bandwidth because less time and energy may be consumed while transferring data, and execution may be performed more quickly. Memory space may be more efficiently used for certain workloads (e.g., general-purpose graphics processing unit applications (GPGPU), artificial intelligence/machine learning, and image and graph processing) because an application may consume less cache line for the same amount of read when all of the data in the cache line is useful.

A mechanism for reordering data for storage and prefetch based on a data access pattern may improve a system performance by providing a storage device that is capable of storing data according to a layout sequence that may be accessed more efficiently by a host computer.

For example, an application running on a host computer (or a remote computer from the host) may send image data to a GPU (or a CPU) of the host computer. A kernel (e.g., a computation kernel) associated with the GPU (or the CPU) may partition the image data, row by row (or line by line), and save the data (e.g., in a cache of the host computer) in a linear sequence. For example, an image from somewhere may be stored to a device (e.g., the host computer) without partitioning (e.g., as-is, or in a linear sequence). A compiler of the host computer (or the remote computer) may analyze an application source code (e.g., a computation kernel) of the application and extract (e.g., determine) a data access pattern from the application source code. The data access pattern may be described using a remapping function. For example, the compiler may generate a remapping function for reordering the data by extracting data access pattern information (e.g., tile dimension information, image dimension information, tile order information, and/or sub-tile order information) from the source code.

The compiler may provide the remapping function to a computation kernel running on the GPU or the CPU. The GPU (or the CPU) may then send the data (arranged according to a linear sequence) and the remapping function (or information corresponding to the mapping function, e.g., a lookup or mapping table) to the storage device.

The storage device may receive the data (e.g., at a cache of the storage device) in the linear sequence. A storage controller of the storage device may then (1) use the remapping function (or table) to reorder the data based on the access pattern associated with the data, and (2) store the data in a memory (e.g., a nonvolatile memory) of the storage device in a layout that may be more efficiently accessed, based on the access pattern.

The storage controller may maintain mapping tables associated with the data (e.g., a tiling access mapping table and/or a linear access mapping table). When the host computer sends a read request to access the data according to a tiling access pattern, the storage controller may provide the first tile to the host computer based on the tiling access mapping table information and quickly prefetch the subsequent tiles using a simple next tile prefetch. When the host computer sends a read request to access the data according to a linear access pattern, the storage controller may provide the data to the host based on the linear access mapping table. Thus, the storage device may provide the data to the host in an efficient and flexible manner.

FIG. 1 is a system diagram depicting a system for reordering data for storage, according to some embodiments of the present disclosure.

Referring to FIG. 1, a system for reordering data for storage 1, may include a storage device 100 (e.g., a solid state drive (SSD)) and a host 200 (e.g., a host computer).

The host 200 may include a graphics processing unit (GPU) and/or a central processing unit (CPU), hereinafter "GPU 210". (That is, throughout the present disclosure, operations described as being related to or performed by a GPU or components of the GPU may, likewise, be related to or performed by a CPU or components of the CPU.) A kernel 211 (e.g., a computation kernel loaded to the GPU's device memory) and a GPU cache 212 may be associated with the GPU 210. For a CPU case, the kernel 211 may be loaded into a host memory 250 (e.g., a system memory). The GPU cache 212 may have a given size (e.g., a fixed size), which may be a relatively small size. The host 200 may include the host memory 250 (e.g., a random access memory (RAM)). Computer programs may be located in (e.g., run on) the host memory 250. For example, a compiler 230 and an application 300 (or workload) may be located in the host memory 250.

Although FIG. 1 depicts the compiler 230 and the application 300 as being located at the host 200, it should be understood that the present disclosure is not limited thereto. For example, the system 1 may have a variety of configurations. In some embodiments, the compiler 230 may be a compiler (e.g., a just-in-time compiler) running on the same machine as the application 300. (In some embodiments, an interpreter may be used alongside, in place of, or in combination with a just-in-time compiler.) In some embodiments, the compiler 230 and the application 300 may run on a different host than the host 200. In some embodiments, the compiler 230 and the application 300 may run on different hosts from each other. For example, the compilation may be done on a different machine (e.g., a different host), and once a program binary code is generated (e.g., by the compiler 230), the program binary code may run on any compatible machine.

The storage device 100 may be connected to the host 200 via a data bus 20. The data bus may include (e.g., may be implemented by way of) a variety of technologies (e.g., peripheral component interconnect express (PCIe), Compute Express Link (CXL), etc.). The storage device 100 may include a device controller 110, a storage device cache 120 (e.g., a volatile memory), and a nonvolatile memory 130. The device controller 110 may include (e.g., may be implemented by way of) a processor and memory with embedded logic (e.g., a microcontroller, an FPGA, etc.) for handling requests from the host 200 to write data to or to read data from the storage device 100. The storage device cache 120 may include a cache line 121 (e.g., a portion of the storage device cache 120 that is the smallest unit of access in the storage device cache 120). The cache line 121 may have a given size (e.g., a fixed size), which may be a relatively small size. The nonvolatile memory 130 may include pages (e.g., a portion of the nonvolatile memory 130 that is the smallest unit of access in the nonvolatile memory 130) having a given size (e.g., a fixed size). The pages may be grouped into blocks, and the blocks may be grouped into sectors (e.g., a sector 131). The storage device 100 may be a cache-line addressable and/or block addressable storage device.

Accordingly, a layout sequence of data stored (e.g., temporarily stored) in the storage device cache 120, the GPU cache 212, and/or the nonvolatile memory 130 may significantly impact their respective efficiencies. For example, scattered data and/or large portions of data may negatively impact efficiency because it may be less efficiently laid out within the given cache or nonvolatile memory spaces.

Figure 2:
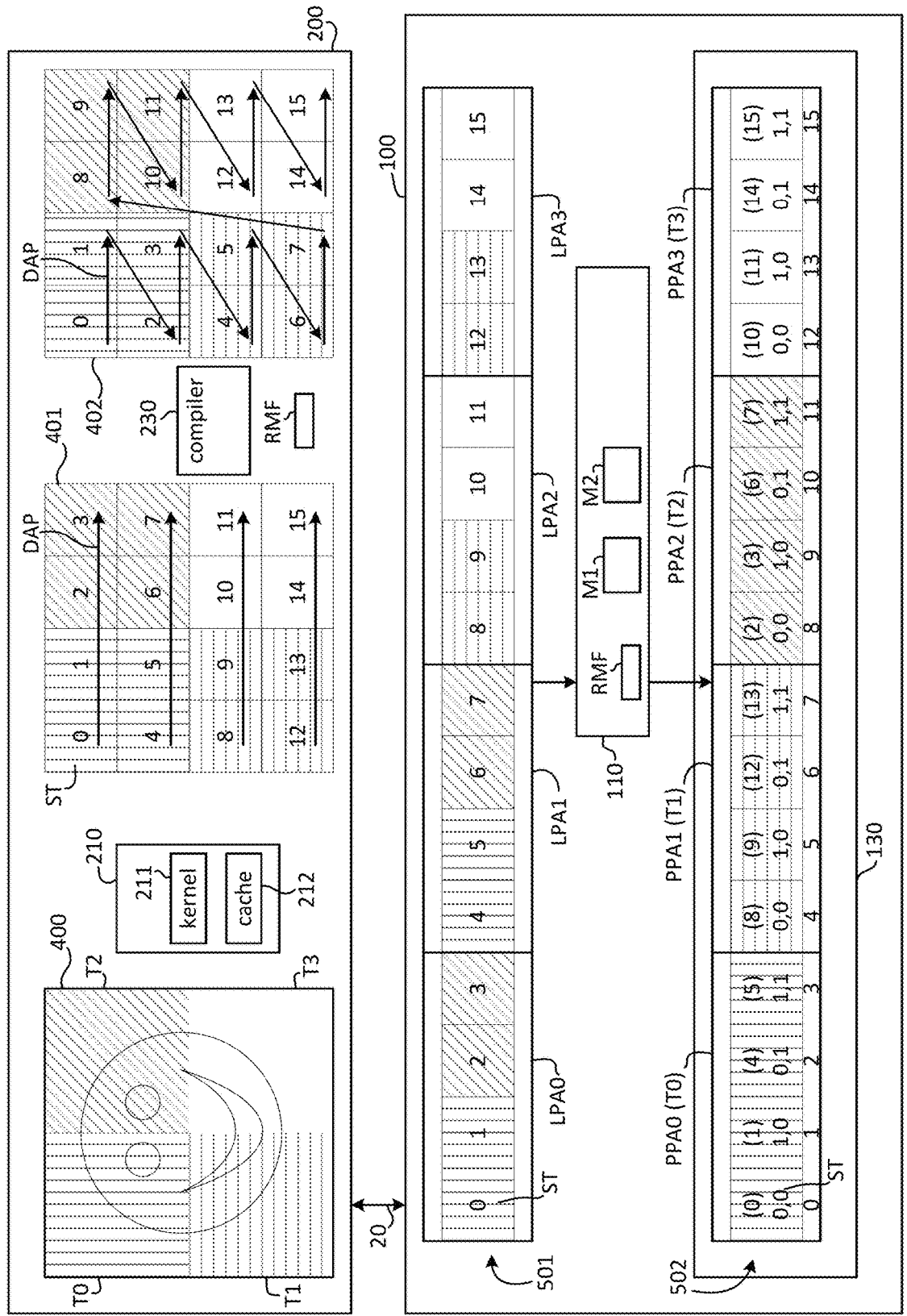
FIG. 2 is a conceptual diagram depicting a system and method for reordering data for storage, according to some embodiments of the present disclosure.

FIG. 2 is a simplified conceptual diagram depicting a system and method for reordering data for storage, according to some embodiments of the present disclosure.

Referring to FIG. 2, the application 300 may send a data 400 (e.g., an image data, or some other data that may correspond to a matrix for matrix manipulation) to the GPU 210. The GPU 210 (e.g., via the kernel 211) may partition the data 400 into smaller portions (e.g., tiles) for processing the data 400. For example, the GPU 210 may partition the data 400 into a tile zero T0 ("T0"), a tile one T1 ("T1"), a tile two T2 ("T2"), and a tile three T3 ("T3"). The GPU 210 may partition each tile further, e.g., into sub-tiles ST. Each sub-tile ST may be partitioned further (e.g., each tile or sub-tile ST may be partitioned down to a pixel level). As discussed in further detail below with reference to FIG. 4, each tile may be represented by a vector. The tiles T0 to T3 may be provided (e.g., ordered) according to a tile sequence associated with the partitioning of the data 400.

The GPU 210 may store (e.g., temporarily store) the data 400 in a cache (e.g., in the GPU cache 212 or in the storage device cache 120, see FIG. 1) according to a first layout sequence 501. For example, the GPU 210 may process the data 400 in a row by row (or line by line) fashion and store the data in a linear sequence, as depicted by a partitioned data having a linear data access pattern 401. Accordingly, the first layout sequence 501 may include (e.g., may be) a linear sequence having one or more tiles corresponding to different logical page addresses LPAs (e.g., an LPA zero LPA0 ("LPA0"), an LPA one LPA1 ("LPA1"), an LPA two LPA2 ("LPA2"), and an LPA three LPA3 ("LPA3"). For example, two sub-tiles ST corresponding to T0 (and respectively corresponding to positions 0 and 1 in the partitioned data having a linear data access pattern 401) may be located in LPA0, while another two sub-tiles ST corresponding to T0 (and respectively corresponding to positions 4 and 5 in the partitioned data having the linear data access pattern 401) may be located in LPA1. For example, the sub-tiles ST associated with T0 may be scattered across different logical page addresses.

In some embodiments, the storage device 100 may store the data 400 in the nonvolatile memory 130 according to the first layout sequence 501 (e.g., for later access by the application 300). In such embodiments, the first layout sequence 501 may be suitable for processing, e.g., by the GPU 210 if the application 300 were to request the data 400 according to a data access pattern DAP corresponding to the first layout sequence 501 (e.g., in the linear sequence).

An application 300 may, however, access the data 400 according to a different data access pattern DAP. For example, the application 300 may request the data 400 according to a tiling access pattern, as depicted by a partitioned data having a tiling or swizzling data access pattern 402 (e.g., because the data 400 may be more easily processed in a tiling or swizzling sequence).

An application 300 may also access the data 400 according to a swizzling access pattern (e.g., within each tile). For example, as depicted in the partitioned data having the tiling or swizzling data access pattern 402, the swizzling data access pattern DAP may be a Z-order (or Morton-coded order) swizzling data access pattern DAP (e.g., in the shape of a "z").

A given data access pattern DAP may depend on the given application 300. A different swizzling data access pattern DAP (e.g., other than a Z-order) may be used by a given application 300. The application 300 may access the sub-tiles ST according to any swizzling access pattern. For example, the application 300 may request access to T0, such that the sub-tile ST corresponding to position 0 (in the partitioned data having the tiling or swizzling data access pattern 402) is accessed three times in a row and the sub-tiles ST corresponding to positions 1, 2, and/or 3 (in the partitioned data having the tiling or swizzling data access pattern 402) are not accessed (e.g., are ignored).

Thus, in cases where the application 300 does not access the data 400 according to the first layout sequence (e.g., in the linear sequence), the processing of the data 400 by the GPU 210 may be stalled (or slowed) while the GPU 210 waits for a next sub-tile ST associated with a given data access pattern DAP of the application 300 to be located and retrieved (e.g., by a prefetcher of the storage device 100, implemented by the device controller 110).

In some embodiments, and as discussed in further detail below in reference to FIGS. 3-6, the compiler 230 may detect a data access pattern DAP in an application source code ASC associated with the application 300 (see FIG. 3). For example, data access pattern information DAPI may be annotated (e.g., by a programmer of the application 300) for extraction by the compiler 230, or the compiler may extract high-level data access pattern information DAPI automatically (e.g., by using an algorithm, such as a loop optimization algorithm). For example, a compiler may automatically extract high-level data access pattern information DAPI by analyzing a loop in the application source code (e.g., a function in the application source code) to determine stride, length, and other information. The compiler 230 may generate a remapping function RMF based on the data access pattern information DAPI. The remapping function RMF may be used to reorder the data 400 from the first layout sequence 501 to a second layout sequence 502 that may be more efficiently accessed by the application 300 according to a data access pattern DAP corresponding to the second layout sequence 502.

In some embodiments, the compiler 230 or a device controller 110 may use the remapping function to generate one or more mapping tables. For example, a first mapping table M1 may be a linear access mapping table, and a second mapping table M2 may be a tiling access mapping table (e.g., for a tiling and/or swizzling data access pattern DAP).

In some embodiments, the compiler 230 may provide the remapping function RMF to the kernel 211. The GPU 210 may send the remapping function RMF and/or the first mapping table M1 (or a portion thereof) and/or the second mapping table M2 (or a portion thereof) to the storage device 100, and may send the data 400 (e.g., arranged according to the first layout sequence 501) to the storage device 100. The storage device 100 may receive the data 400 (e.g., at the storage device cache 120), and the device controller 110 may use the remapping function RMF and/or the first mapping table M1 (or a portion thereof) and/or the second mapping table M2 (or a portion thereof) to reorder the data 400 from the first layout sequence 501 to the second layout sequence 502. Accordingly, the device controller 110 may store the data 400 at physical page addresses PPA of the nonvolatile memory 130 according to the second layout sequence 502. For example, T0 may be stored in in in a physical page address zero PPA0 ("PPA0"), T1 may be stored in in in a physical page address one PPA1 ("PPA1"), T2 may be stored in in in a physical page address two PPA2 ("PPA2"), and T3 may be stored in in in a physical page address three PPA3 ("PPA3"). Thus, the sub-tiles ST associated with each tile T0 to T3 may be located adjacently to one another, such that, for example, the sub-tiles ST corresponding to T0 are not scattered (e.g., not separated by sub-tiles ST of other tiles, e.g., T1 to T3).

In some embodiments, the storage controller 110 may maintain (e.g., store) the first mapping table M1 (e.g., the linear access mapping table) and the second mapping table M2 (e.g., the tiling and/or swizzling access mapping table). When the host 200 sends a read request RD_REQ (see FIG. 5) to access the data 400 according to a tiling and/or swizzling data access pattern DAP, the device controller 110 may provide a first tile, for example, T0 based on the second mapping table M2 and may prefetch (e.g., quickly or efficiently prefetch) the subsequent tiles T1 to T3 using a simple next tile prefetch NP. When the host 200 sends a read request RD_REQ to access the data 400 according to a linear data access pattern DAP, the device controller 110 may provide the data 400 (e.g., the sub-tiles ST) based on the first mapping table M1. In some embodiments, the device controller 110 may control a prefetcher to prefetch a next page based on the data access pattern DAP currently being used (e.g., based on a which mapping table is currently being used). Accordingly, the storage device 100 may provide the data 400 to the host 200 in an efficient and flexible manner.

Figure 3:
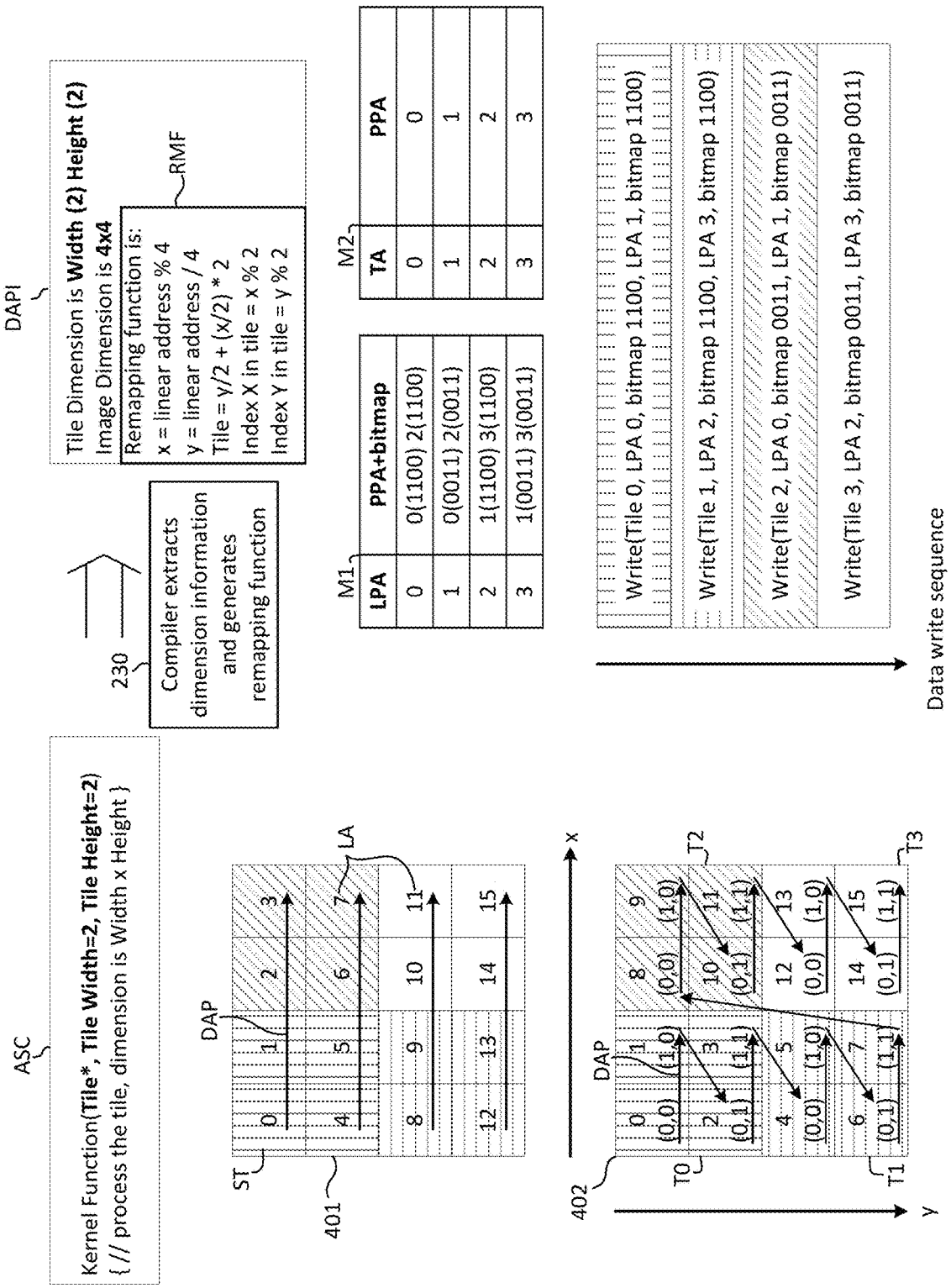
FIG. 3 is a conceptual diagram depicting a method for generating a remapping function for reordering data for storage, according to some embodiments of the present disclosure.

FIG. 3 is a simplified conceptual diagram depicting a method for generating a remapping function for reordering data for storage, according to some embodiments of the present disclosure.

Figure 4:
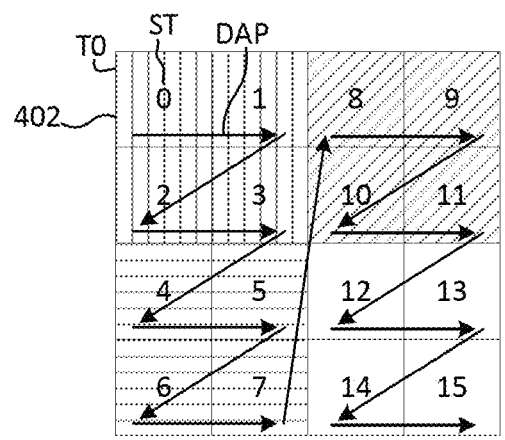
FIG. 4 is a conceptual diagram depicting a use of vectors to represent tiles and data access patterns within tiles for reordering data for storage, according to some embodiments of the present disclosure.
Figure 4:
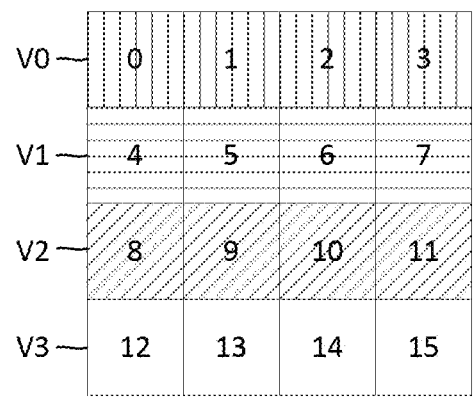
Figure 4:
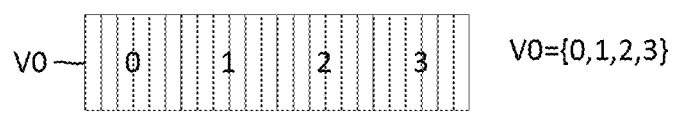
Figure 4:
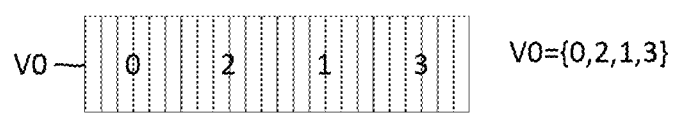

FIG. 4 is a simplified conceptual diagram depicting a use of vectors to represent tiles and data access patterns within tiles for reordering data for storage, according to some embodiments of the present disclosure.

Referring to FIG. 3, the compiler 230 may extract data access pattern information DAPI from the application source code ASC of the application 300. For example, the data access pattern information DAPI may include tile dimension information, tile order information, image dimension information, and/or sub-tile order information. For example, tile dimension information may include a tile width, a tile height, and an image dimension. For example, each tile T0 to T3 may have a width of two (for example, may include two sub-tiles ST) and a height of two (for example, may include two sub-tiles. The image dimension may be 4×4 (e.g., the overall image data 400 may have dimensions of four sub-tiles ST in width by four sub-tiles ST in height.

Furthermore, the application source code ASC may provide at least some of the data access pattern information DAPI as vector information.

For example, and referring to FIG. 4, vectors may be used to represent tile order information and sub-tile order information. In image processing, a GPU may process data (e.g., image data) according to single instruction multiple data (SIMD) instructions that operate on vectors.

For example, a vector may represent a tile, and each vector may identify how the data corresponding to the vector may be ordered. For example, a vector zero V0 ("V0") may represent T0 of the partitioned data having the tiling or swizzling data access pattern 402. Accordingly, the sub-tiles ST corresponding to positions 0, 1, 2, and 3 may be represented by a vector V0={0, 1, 2, 3}. The vector may be reordered, for example, by altering the vector to V0={0, 2, 1, 3}, or any other arrangement (e.g., any other predetermined arrangement) based on an SIMD instruction.

For example, a vector may be pre-rearranged according to a swizzling configuration and/or a tiling configuration. For example, a given vector may be A={x, y, z, w} and the application 300 may want to access the vector in the order A.w A.w, A.x, A.y. This data access pattern DAP order may be written as A.wwxy, and may effectively be used to access vector {w, w, x, y} instead of the original {x, y, z, w}. In this example, the application 300 would ignore z completely. Accordingly, the compiler 230 may generate a more efficient storage order (e.g., an optimal storage order) {w, x, y, z} by pre-rearranging vectors to correspond to the data access pattern DAP.

Referring to FIG. 3, the compiler 230 may extract the data access pattern information DAPI to generate the remapping function RMF. For example, a linear address LA of 7 (in the partitioned data having a linear data access pattern 401) may be plugged into the remapping function RMF to be reordered to position 11 in the partitioned data having the tiling or swizzling data access pattern 402, corresponding to T2 and having an Index X in T2 of 1 and an Index Y in T2 of 1 (see also FIG. 2).

In some embodiments, the compiler 230 and/or the device controller 110 may use the remapping function RMF to generate (e.g., to maintain) the first mapping table M1 (e.g., a linear access mapping table) and the second mapping table M2 (e.g., the tiling and/or swizzling access pattern table). The device controller 110 may then reorder the data 400 according to the given data access pattern DAP. For example, the first mapping table M1 may list logical page addresses LPAs (for a linear sequence of the data 400) and cross-reference the logical page addresses LPAs with corresponding physical page addresses PPAs (associated with the second layout sequence 502) in the nonvolatile memory 130 (and corresponding bitmap locations of the appropriate sub-tiles ST corresponding to the logical page addresses LPAs). The second mapping table M2 may list the tile addresses TA and cross-reference the tile addresses TA with corresponding physical page addresses PPAs. The tile addresses TA may have a one-to-one correspondence with the physical page addresses PPA when the data has been written to the nonvolatile memory 130 according to the second layout sequence 502. Accordingly, a data write sequence may be ordered according to tile order (instead of linear address order).

Figure 5:
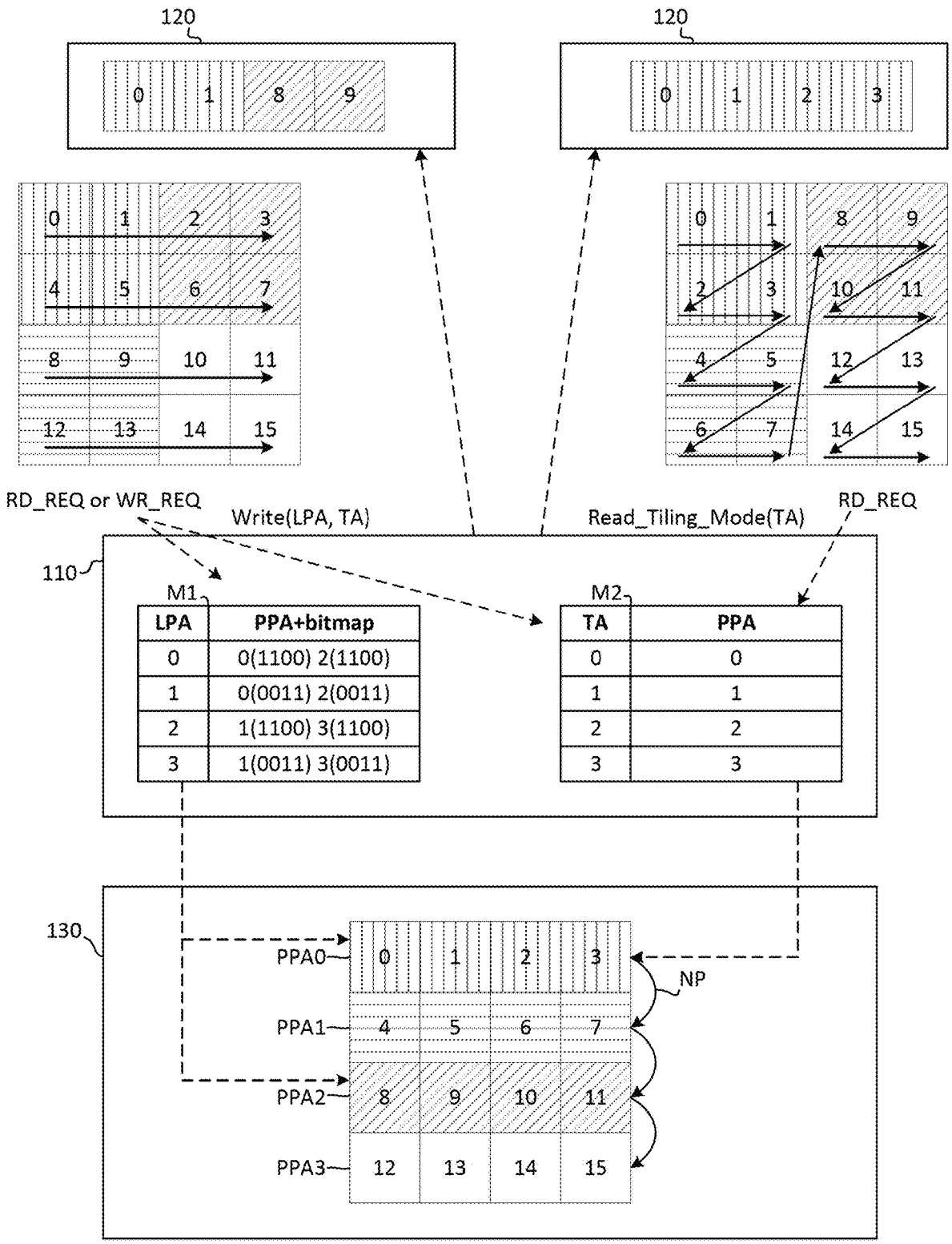
FIG. 5 is a conceptual diagram depicting a use of mapping tables for reordering data for storage, according to some embodiments of the present disclosure.

FIG. 5 is a simplified conceptual diagram depicting a use of mapping tables for reordering data for storage, according to some embodiments of the present disclosure.

Referring to FIG. 5, the storage controller 110 may process a read request RD_REQ or a write request WR_REQ by referring to the first mapping table M1 when the requests correspond to a linear data access pattern DAP, or by referring to the second mapping table M2 when the request correspond to a tiling and/or swizzling access pattern. The storage device 100 (e.g., a prefetcher of the storage device) may return the data 400 to a cache (e.g., the storage device cache 120) according to the data access pattern DAP for the data 400.

When the data has been written to (e.g., stored in) the nonvolatile memory 130 according to the second layout sequence 502 and a read request RD_REQ corresponds to the second layout sequence 502, the storage device 100 may return (e.g., efficiently return) the data 400 corresponding to, for example, PPA0 and then return (e.g., efficiently return) the subsequent data 400 corresponding to, for example, PPA1 to PPA3 based on (e.g., according to or using) an efficient prefetch (e.g., a next tile prefetch NP).

Figure 6:
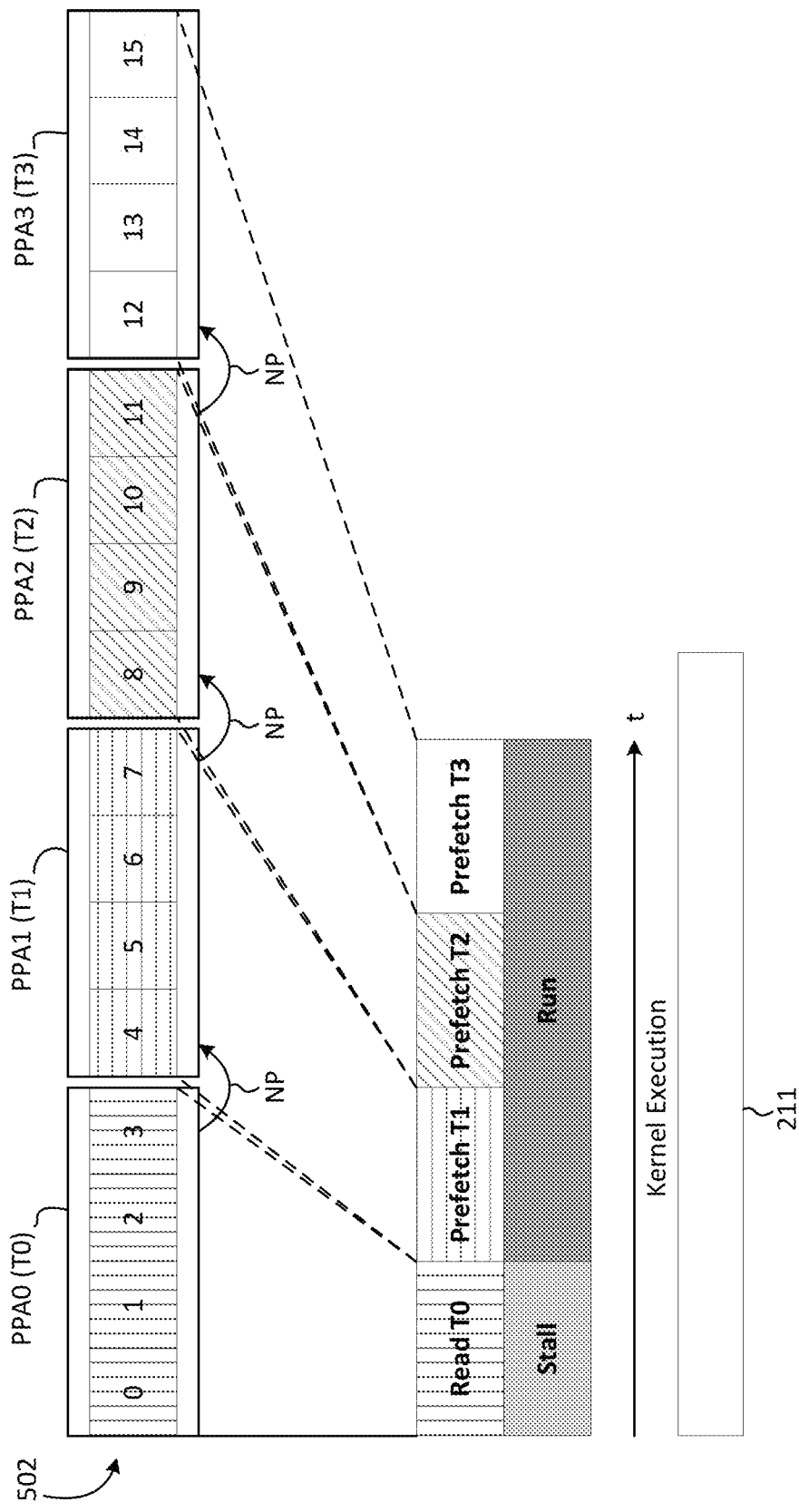
FIG. 6 is a conceptual diagram depicting an improved processing time associated with the reordering of data for storage, according to some embodiments of the present disclosure.

FIG. 6 is a simplified conceptual diagram depicting an improved processing time associated with the reordering of data for storage, according to some embodiments of the present disclosure.

Referring to FIG. 6, each tile in the second layout sequence 502 may be efficiently located and returned. In comparison to storing the data 400 according to a sequence that deviates from the data access pattern DAP, a kernel execution time of the kernel 211 may be reduced when storing the data 400 according to the data access pattern DAP.

FIG. 7 is a flowchart depicting example operations of methods for reordering data for storage, according to some embodiments of the present disclosure.

Referring to FIG. 7, a method 7000 for reordering data for storage may include detecting a data access pattern (operation 7100), generating a remapping function based on data access pattern information (operation 7200), receiving the data at a storage device, the data being ordered according to a first layout sequence (operation 7300), reordering the data based on the remapping function (operation 7400), storing the data according to a second layout sequence corresponding to the data access pattern (operation 7500), and storing the data, in a nonvolatile memory of the storage device, according to a second layout sequence corresponding to the data access pattern (operation 7600).

Accordingly, embodiments of the present disclosure provide improvements to placement and prefetching of data within a storage device for more efficient access to the data. By using a compiler to detect a data access pattern for the data and using data access pattern information to generate a remapping function, a storage device may store the data and return the data such that an application requesting to access the data may do so efficiently, and system performance may be improved.

While embodiments of the present disclosure have been particularly shown and described with reference to the embodiments described herein, it will be understood by those of ordinary skill in the art that various changes in form and details may be made therein without departing from the spirit and scope of the present invention as set forth in the following claims and their equivalents.

What is claimed is:

1. A method for reordering data for storage, the method comprising
   detecting a data access pattern, associated with an application, for accessing a data,
   generating a remapping function based on a data access pattern information, the remapping function including operations to determine a reordering of the data based on address information for the data,
   receiving the data at a storage device, the data being ordered according to a first layout sequence,
   reordering the data, by the storage device, based on the remapping function,
   storing the data, at the storage device, according to a second layout sequence that has a physical order corresponding to the data access pattern, and
   prefetching the data based on the second layout sequence, such that the data is accessed by the application based on fewer transfers in the second layout sequence than in the first layout sequence.

2. The method of claim 1, wherein the reordering of the data based on the remapping function comprises receiving the remapping function at the storage device or receiving a mapping table at the storage device.

3. The method of claim 1, wherein the data access pattern is detected by determining the data access pattern information from an application source code of the application.

4. The method of claim 1, wherein the data access pattern comprises a tiling access pattern or a swizzling access pattern.

5. The method of claim 4, wherein
   the data comprises an image data, the tiling access pattern corresponds to a partitioning of the image data by a graphics processing unit (GPU) or a central processing unit (CPU), the second layout sequence comprises a tile sequence corresponding to the tiling access pattern, and the first layout sequence comprises a linear sequence corresponding to an ordering of rows associated with the image data.

6. The method of claim 5, wherein the second layout sequence further comprises an ordering of sub-tiles within an ordering of tiles, the ordering of sub-tiles corresponding to the swizzling access pattern.

7. The method of claim 6, wherein the data access pattern information comprises tile dimension information, tile order information, image dimension information, or sub-tile order information.

8. The method of claim 1, wherein the detecting the data access pattern or the generating the remapping function are performed by a compiler.

9. The method of claim 1, further comprising storing, at the storage device a first mapping table associated with accessing the data according to the first layout sequence, and a second mapping table associated with accessing the data according to the second layout sequence, receiving, by the storage device, a request to access the data according to the first layout sequence or the second layout sequence, and returning the data, by the storage device, in the first layout sequence based on the first mapping table or in the second layout sequence based on the second mapping table.

10. The method of claim 9, wherein the first mapping table comprises a linear access mapping table, the second mapping table comprising a tiling access mapping table, and the returning the data in the second layout sequence comprises returning a first tile and prefetching a second tile based on a next tile prefetch.

11. A storage device for reordering data for storage, the storage device being configured to detect a data access pattern, associated with an application, for accessing a data, receive the data ordered according to a first layout sequence, reorder the data based on a remapping function, the remapping function being generated based on data access pattern information, and including operations to determine a reordering of the data based on address information for the data, store the data, at a nonvolatile memory of the storage device, according to a second layout sequence that has a physical order corresponding to the data access pattern, and prefetch the data based on the second layout sequence, such that the data is accessed by the application based on fewer transfers in the second layout sequence than in the first layout sequence.

12. The storage device of claim 11, wherein the reordering of the data based on the remapping function comprises receiving the remapping function at the storage device or receiving a mapping table at the storage device.

13. The storage device of claim 11, wherein the data access pattern is detected by determining a data access pattern information from an application source code of the application.

14. The storage device of claim 11, wherein the storage device is configured to store a first mapping table associated with accessing the data according to the first layout sequence, store a second mapping table associated with accessing the data according to the second layout sequence, receive a request to access the data according to the first layout sequence or the second layout sequence, and return the data in the first layout sequence based on the first mapping table or in the second layout sequence based on the second mapping table.

15. The storage device of claim 14, wherein the first mapping table comprises a linear access mapping table, the second mapping table comprising a tiling access mapping table, and the returning the data in the second layout sequence comprises returning a first tile and prefetching a second tile based on a next tile prefetch.

16. A system for reordering data for storage, the system comprising a host configured to detect a data access pattern, associated with an application, for accessing a data, and a storage device configured to receive a data that is ordered according to a first layout sequence, reorder the data based on a remapping function, the remapping function being generated based on data access pattern information, and including operations to determine a reordering of the data based on address information for the data, store the data, at a nonvolatile memory of the storage device, according to a second layout sequence that has a physical order corresponding to the data access pattern, and prefetch the data based on the second layout sequence, such that the data is accessed by the application based on fewer transfers in the second layout sequence than in the first layout sequence.

17. The system of claim 16, wherein the reordering of the data based on the remapping function comprises receiving the remapping function at the storage device or receiving a mapping table at the storage device.

18. The system of claim 16, wherein the data access pattern is detected by determining a data access pattern information from an application source code of the application.

19. The system of claim 16, wherein the storage device is configured to store a first mapping table associated with accessing the data according to the first layout sequence, store a second mapping table associated with accessing the data according to the second layout sequence, receive a request to access the data according to the first layout sequence or the second layout sequence, and return the data in the first layout sequence based on the first mapping table or in the second layout sequence based on the second mapping table.

20. The system of claim 19, wherein the first mapping table comprises a linear access mapping table, the second mapping table comprising a tiling access mapping table, and the returning the data in the second layout sequence comprises returning a first tile and prefetching a second tile based on a next tile prefetch.

* * * * *